(12) United States Patent
Nourse

(10) Patent No.: US 6,345,212 B1
(45) Date of Patent: Feb. 5, 2002

(54) AUTOMATIC VARIABLE LINKAGE MECHANISM FOR INTEGRATING THIRD PARTY SOFTWARE COMPONENTS

(75) Inventor: Bruce E. Nourse, Ann Arbor, MI (US)

(73) Assignee: Manufacturing Data Systems, Inc., Ann Arbor, MI (US)

( * ) Notice: Subject to any disclaimer, the term of this patent is extended or adjusted under 35 U.S.C. 154(b) by 0 days.

(21) Appl. No.: 09/294,667

(22) Filed: Apr. 19, 1999

Related U.S. Application Data

(63) Continuation-in-part of application No. 09/197,049, filed on Nov. 20, 1998.

(51) Int. Cl.[7] ............................................. G06F 17/00
(52) U.S. Cl. ...................................... 700/182; 700/90
(58) Field of Search ............................. 700/1, 5, 3, 30, 700/68, 181, 90, 67; 318/571

(56) References Cited

U.S. PATENT DOCUMENTS

| | | | | |
|---|---|---|---|---|
| 4,734,847 A | * | 3/1988 | Hunter | 700/68 |
| 4,990,840 A | * | 2/1991 | Migda | 318/571 |
| 5,453,933 A | * | 9/1995 | Wright et al. | 700/181 |
| 5,978,578 A | * | 11/1999 | Azarya et al. | 700/1 |
| 5,984,499 A | * | 11/1999 | Nourse et al. | 700/5 |

* cited by examiner

Primary Examiner—William Grant
Assistant Examiner—Kidest Bahta
(74) Attorney, Agent, or Firm—Harness, Dickey & Pierce, P.L.C.

(57) ABSTRACT

A software-based controller system implemented on a generic computer hardware platform for numerically controlling a machine tool. The software-based controller system includes a servo mechanism associated with the numerically controlled system, a real-time module for performing numeric control operations through the use of the servo mechanism, a p-code runtime engine receptive of interpreted program instructions for performing computational operations independent from the control of the servo mechanism, and a messager module communicating with the real-time module and the runtime engine to implement a pointer architecture that facilitates communication between the real-time module and the runtime engine. The messager module defines a common location in a shared memory that is accessible to the real-time module, runtime engine, and messager module. The real-time module and the runtime engine communicate through this shared memory by using the pointer architecture to point from the real-time module and the runtime engine to the common location in shared memory, thereby supporting control operations on the numerically controlled system.

14 Claims, 4 Drawing Sheets

AUTOMATIC VARIABLE LINKAGE MECHANISM FOR INTEGRATING THIRD PARTY SOFTWARE COMPONENTS

CROSS REFERENCE TO RELATED APPLICATIONS

This application is a continuation-in-part of U.S. patent application Ser. No. 09/197,049, filed Nov. 20, 1998 entitled "Automatic Variable Linkage Mechanism For Integrating Third Party Softare Components", assigned to the assignee of the present invention.

BACKGROUND OF THE INVENTION

1. Technical Field

The present invention relates to a numerically controlled machine tool and more particularly, a software-based numeric control system using an automatic variable linkage mechanism to integrate software components.

2. Discussion of Related Art

Numerical control systems control physical manufacturing processes, such as metal cutting or forming operations, and involve coordinated motion control interacting with discrete digital control signals, across a variety of machine tools. Numerically controlled machine tools range from large, high end, multi (>3) axis, contouring machine tools with automatic tool changers and automatic pallet loading/unloading to low end two axis lathes, two axis drills and sheet metal punching machines. Some very large machine tools coordinate as many as four or more spindles operating simultaneously.

The central feature of these numerical control systems and their controlled machine tools is a part program (as opposed to a computer program). This program may control all of a sequence of operations including, but not limited to, part loading and unloading, tool selection and changing, spindle speed and feed rate control, and all of the cutting motions required to manufacture a given part.

Paramount to the future of these machine tools is the ability to adapt. To do so, they must be able to; utilize current electronic technology, allow an easy upgrade of vendor supplied features, and accommodate the inclusion of user designed and implemented features. These features may incorporate new ideas that give the machine tool capabilities not planned or understood at the time the machine tool was manufactured.

A "black box" controller comprises many proprietary hardware circuits that describes the motion and related machining activities to be performed. The controller supplies control signals (i.e., digital or low voltage DC signals), such that there is one signal for each axis of motion. The control signal is fed to a servo device, a type of amplifier that boosts the control signal to the level required for driving the axis motor. A typical axis motor might require a voltage on the order of 220 to 440 volts 3 phase in a large system. The axis motor in turn drives an axis or motion of the machine tool that is ultimately coupled to the tool being controlled. A feedback device (e.g., an encoder or other similar device) may integrate in the servo motor device or attach to the axis or motion to provide a feedback signal to the controller. The feedback device provides the controller with information about the actual position of the axis or motion so that the controller can make automatic corrections if the axis or motion deviates from its commanded position. When feedback is used, the system is said to have a closed loop control.

The "black box" also contains some form of programmed logic controller. This may be implemented in discrete hardware or use some proprietary soft controller design. The programmed logic is used to watch digital and analog inputs, which monitor controller operation, and to set digital and analog outputs to effect control functions. The logic added to this portion of the control is done in the proprietary language of the control and is difficult or impossible to change by the end user. If special machine specific functions are added to the control, the proprietary control manufacturer must add them.

The first controls were constructed using discrete transistorized circuits. With advancing technology, many of these dedicated discrete circuits were replaced first by mini computers, then by microcomputers. Market leaders in the area of micro-controllers have employed a business strategy that has been to maintain the "black box" control as a proprietary technology. Although the customer supplies the numerical control part program (describing the desired motion and ancillary machining activities), the customer is given limited documentation and access to the internal workings of the control. The proprietary strategy allows the control manufacturer to require the customer to purchase all of the peripheral components from that manufacturer. These proprietary hardware solutions may use circuits with DSP chips that are programmed in firmware (i.e., burned into EPROMs) to handle the real time computational-intensive tasks.

Machine tool control theory continues to advance. Users who have purchased machine tools would like to add new features as they become available, to improve the accuracy and productivity of their machines. In many cases, the user may want to add a feature giving their company a manufacturing advantage over competitors. For these reasons, it is useful to have a control, which is easy to upgrade and user extendable. Proprietary controls do not allow this capability.

Several software implemented programmable logic controllers are available in the market. To produce a programmed logic control program, the customer often utilizes a third party sequential logic software tool which includes a workbench component and a runtime engine component. The workbench component is a CASE tool editor used to create sequential logic; that is digital input/output objects that define unique inputs and outputs which are to be logically sequenced and connected to one another during configuration. In the workbench, the customer creates sequential logic in terms of some programming language, which is in turn translated into p-code (i.e., pseudo code). A runtime engine then interprets the p-code into native computer instructions for execution. In other words, different runtime engines exist for each sequential logic software tool. The user could use any of these soft programmable logic controllers to add the programmable logic portion to a machine tool control.

Accordingly, a need exists for a software-based numerical control system using off the shelf generic computing hardware such as a PC. This software-based system should allow p-code runtime engines and other user generated capabilities to be integrated programmatically at start up time, based on system requirements dictated by the user

SUMMARY OF THE INVENTION

A software-based controller system is provided for numerically controlling a machine tool. The system includes a servo mechanism associated with the numerically controlled system, a real-time module for performing numeric control operations through the use of the servo mechanism, a p-code runtime engine receptive of interpreted program instructions for performing computational operations independent from the control of the servo mechanism, and a messager module communicating with the real-time module and the runtime engine to implement a pointer architecture that facilitates communication between the real-time module and the runtime engine. The messager module defines common locations in a shared memory that are accessible to the real-time module, runtime engine, and messager module. The real-time module and the runtime engine communicate through this shared memory by using a pointer architecture to point from the modules to common locations in shared memory, thereby supporting control operations on the numerically controlled system. The messager facilitates the layout of the shared memory and the setup of pointers for modules accessing the memory by pointer. The messager continues to exist during running to allow reading and writing of variables by messaging for programs which do not require fast real-time access.

BRIEF DESCRIPTION OF THE DRAWINGS

Additional advantages and features of the present invention will become apparent to those skilled in the art upon reading the following detailed description and upon reference to the drawings in which.

DETAILED DESCRIPTION OF THE PREFERRED EMBODIMENT

The following description of the preferred embodiment is merely exemplary in nature and is no way intended to limit the invention or its application or its uses. Moreover, the following description, while depicting a software architecture for controlling the motion of a numerically controlled machine tool, it is intended to adequately teach one skilled in the art to make and use a software architecture that would apply in any generalized process control application.

Figure 1:
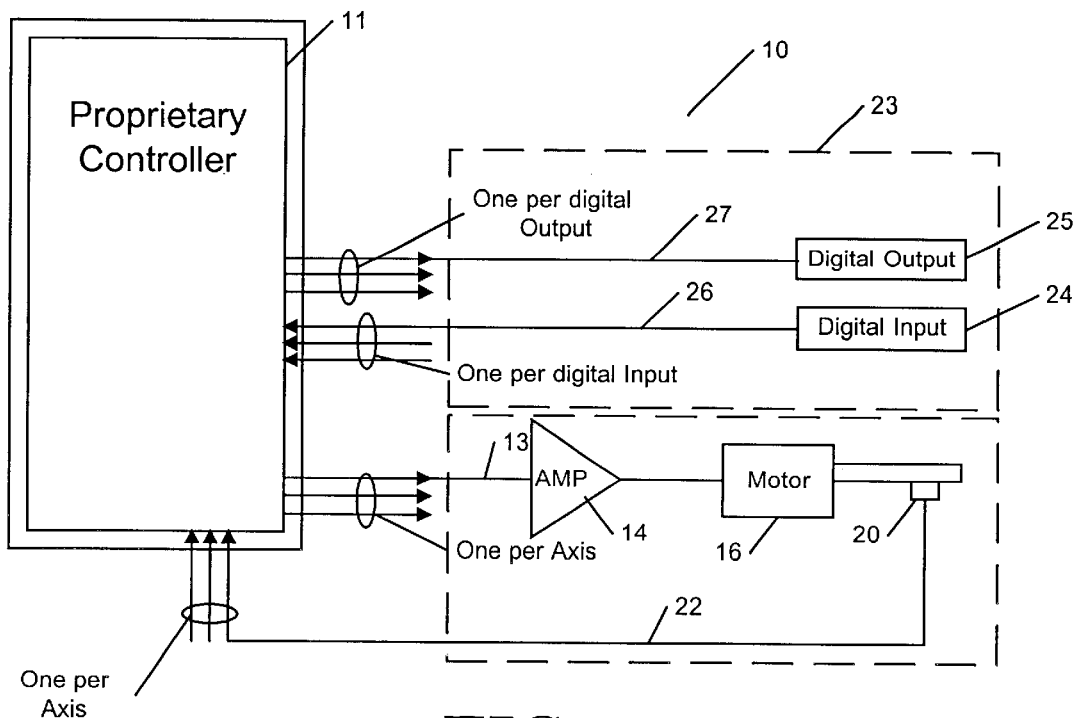
FIG. 1 is a diagram showing the system components for supporting numerical control systems in the prior art.

FIG. 1 shows a basic component of the prior art numerical control system 10 used for controlling the motion of one axis of a numerically controlled machine tool. A proprietary hardware based controller 11 will send a control signal 13 to a servomechanism 12 associated with each axis of motion employed in the numerical control system 10. Servomechanism 12 includes a servo controller or device 14 for each axis of motion (only one is shown) that is coupled to the controller 11. The control signal 13 sent by the controller 11 is amplified by the servo device 14 to a level required (if any) for driving an axis motor 16. The axis motor 16 in turn drives the axis or motion 18 that is coupled to the fixture or tool being controlled by the system 10. A feedback device 20 is attached to the axis or motion 18 to provide a feedback signal 22 to the controller 11. The feedback device 20 provides the controller 11 with information about the actual position of the axis or motion 18, so that the controller 11 can make automatic corrections if the axis or motion drifts from its commanded position. In addition, there is a system 23 of digital inputs and outputs that may be used by the controller 11. For example, a digital input device 24 providing a digital input signal 26 to the controller 11 and a digital output signal 27 from the controller 11 that drives a digital output device 25. These digital inputs and outputs are representative of many in such a control system.

Figure 2:
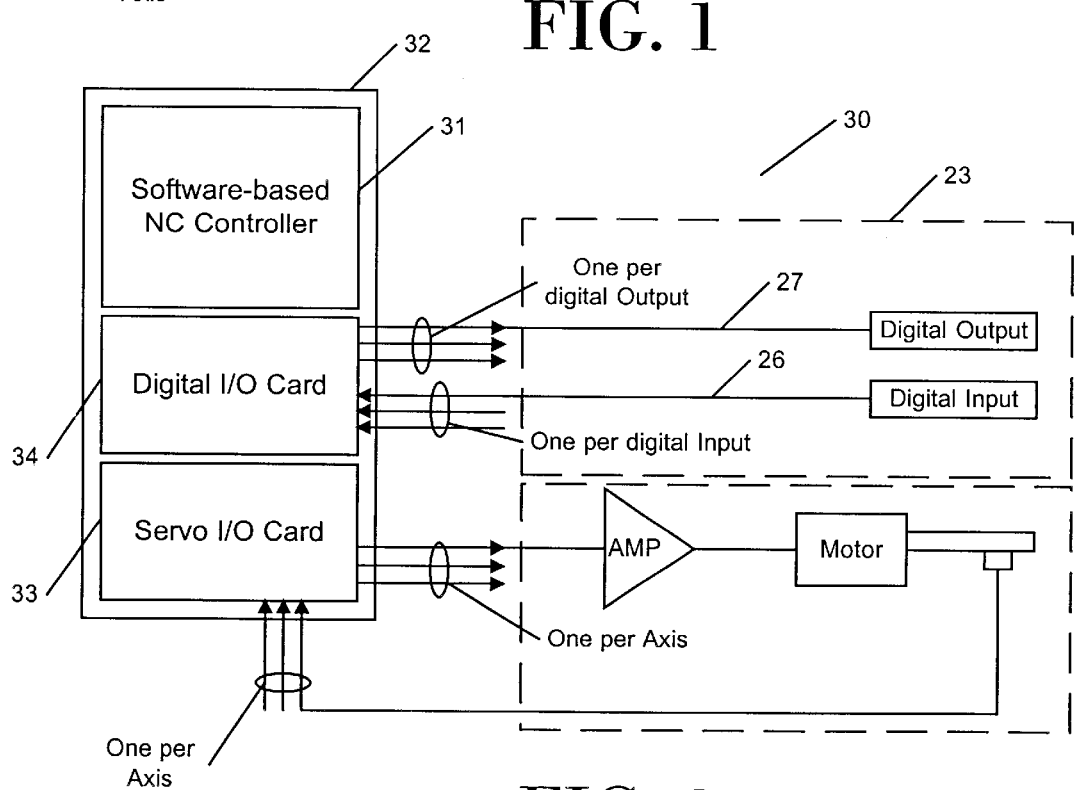
FIG. 2 is a diagram showing the system components for supporting numerical control systems in the present invention.

As shown in FIG. 2, a software-implemented numerical control system 30 is employed in the present invention. Similar to the prior art control system 10, the present invention also includes a servo mechanism 12 for each axis of motion. However, a computer 32 employing a software-based controller 31 has replaced a proprietary hardware controller. In other words, the computer 32, such as a PC, serves as the system controller and is equipped with one of several, off-the-shelf generic input/output cards 33 that supplies a control signal (either analog or digital) to servomechanism 12 as well as receives similar signals from feedback device 20. To support a programmable logic control module (not shown), there is also a second off-the-shelf generic card 34 for reading digital control signals 26 and writing digital controls signal 27 in the digital system 23. There is no proprietary hardware used in the present invention.

Figure 3:
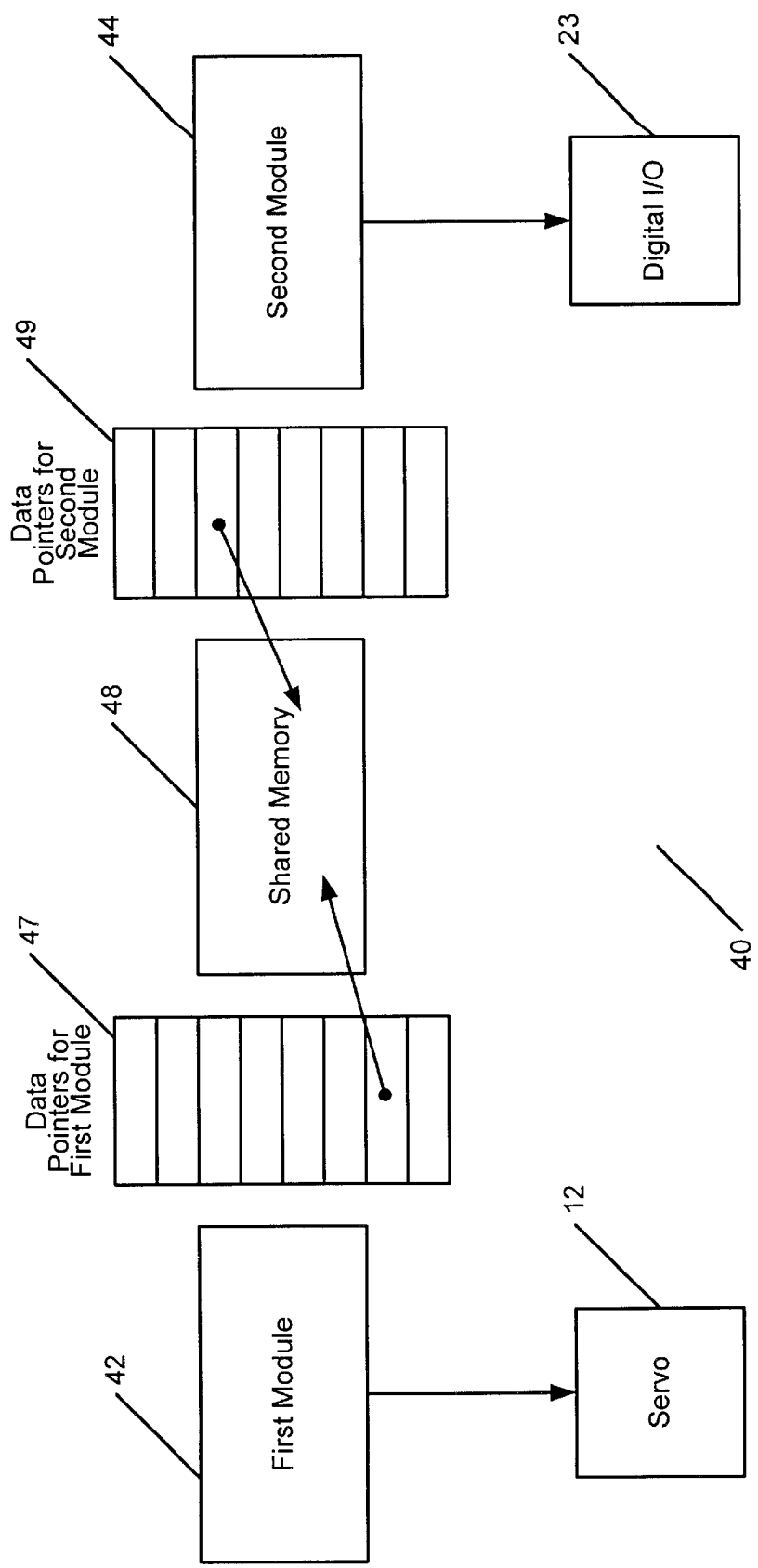
FIG. 3 is a diagram showing the basic software components for accessing variables in the numerical control system in the present invention.

FIG. 3 shows the basic components of a software architecture 40 used to support numeric control operations in a software-based controller 31. A first module(s) or a "real-time" module 42 performs typical numerical control operations relating to the control of servo mechanism 12, including (but not limited to) converting part programs into motion control commands, issuing motion control commands, interrupt handling, closing the feedback loop, analyzing current position data and calculating correction commands. A second module 44 may also be used to perform operations independent from the control of the servomechanism 12. More specifically, second module 44 is a p-code runtime engine comprising an interpreter that drives a digital I/O system 23. In this case, a programmable logic control program is interpreted by the runtime engine to support control operations in the numerically controlled system. Second module 44 can be implemented using a third party software component which is in turn integrated with the numerical control system 30 of the present invention.

A shared memory 48 is accessible by the first and second modules 42 and 44 for communicating control data. In this way, the shared memory 48 serves as a "real time" database, such that information needed for handling rapidly occurring control functions are stored in this data structure. A pointer architecture into shared memory 48 facilitates communication between the first module 42 and the second module 44. Data pointers 47 and 49 with addresses to physical memory are used by the first module 42 and the second module 44, respectively, because pointers can access stored information in a minimum number of computer instructions. Access through pointers makes the system very fast, allowing control over real time operations that would not be as efficient if other more computationally intensive memory addressing techniques were used.

Figure 4:
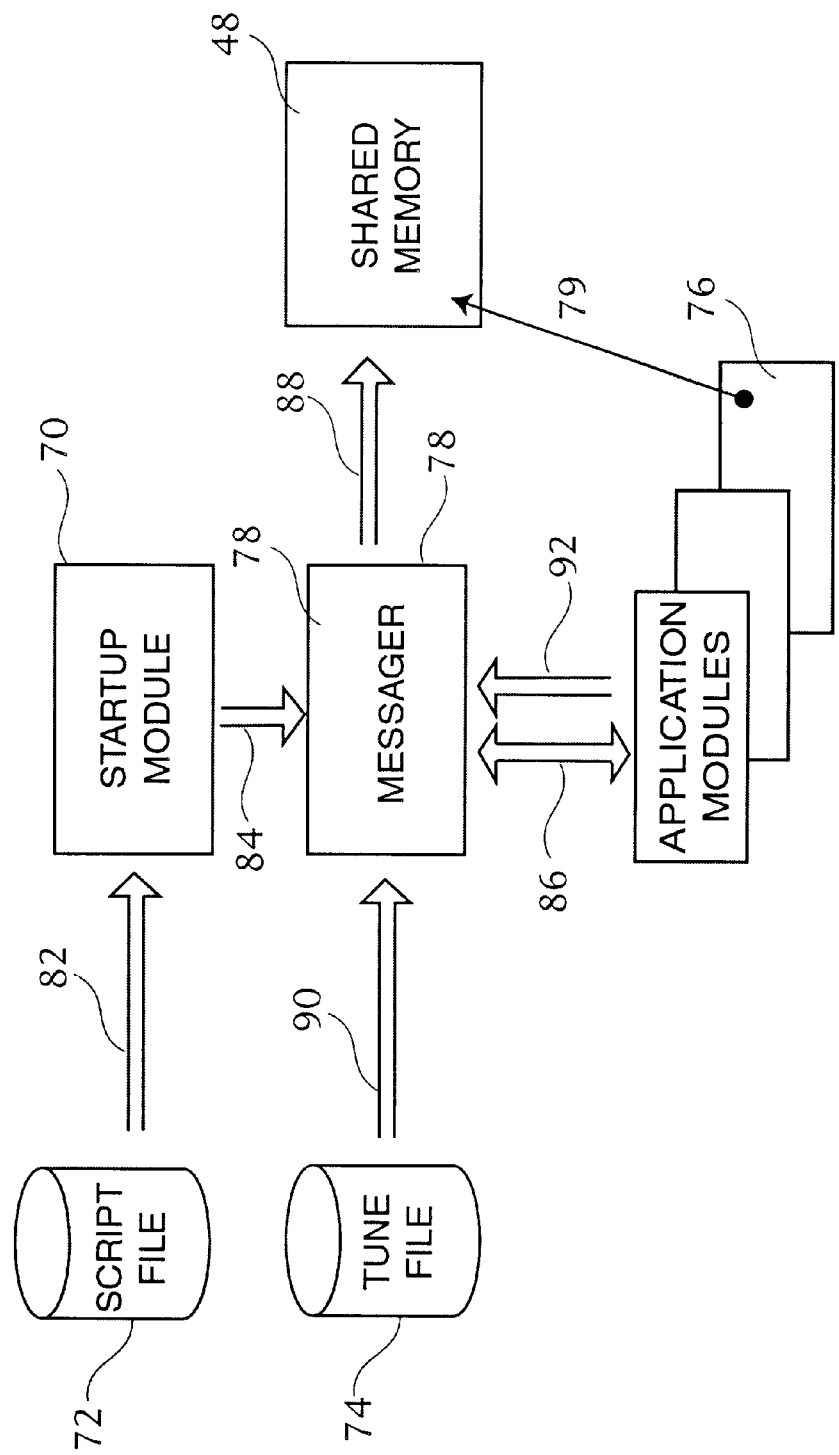
FIG. 4 is a functional diagram showing the steps for configuring and initiating the computer-implemented system in the present invention.

The first and second modules 42 and 44 (e.g., the real-time module and the runtime engine, respectively) access an automatic variable linkage mechanism to establish communication with one another. Preferably, the automatic variable linkage mechanism is designed to provide linkage services to a variety of application modules in the software architecture 40, including the real-time module and the runtime engine. The automatic variable linkage mechanism is invoked at the time of system initialization and configures the system as shown in FIG. 4.

First, a startup module 70 for configuring the system is started by a user command. The startup module 70 reads in 82 a user generated script file 72.

Depending on the specific numeric control tasks to be performed, the script file 72 dictates which application modules 76 will be created. The modules, in turn, define what data structures these application modules will need. Using a script to configure the system makes the system very easy to change, if new control tasks, new software components or machine hardware are later added to the system. For example, if the system is upgraded to support a new type of work-holding system (e.g., a pallet changer), the user easily upgrades the system configuration by changing the script file 72. Similarly, if a sequential logic tool is used to produce a programmable logic control program, its corresponding p-code runtime engine can easily be integrated into the system.

As part of the startup process, the startup module 70 initiates 84 a messager module 78 that is used to establish the communication link between the application modules 76 and shared memory 48. Based upon the script commands, execution of each application module needed for a given task is initiated by the messager 78. A third party software component is initiated in the same manner as any other application module associated with the system. Each application module 76 in turn runs the necessary preliminary steps, such that it can register 86 program variables with the messager 78. To register a variable, an application module provides the messager with the variable string name and its data structure. As will be apparent to one skilled in the art, only those variables that are being communicated between application modules need to be registered with the messager 78.

Once each application module 76 has registered variables, the messager 78 allocates 88 an appropriate common location in shared memory 48, which serves as the real time database. After the shared memory 48 is allocated a tune file 74 is read 90 by the messager 78 to establish initial variable values. Before beginning execution of its numerical control tasks, each application module that needs access to a registered variable(s) communicates 92 with the messager 78 to get an offset value from the beginning of shared memory. A requesting application uses this offset value to determine a unique pointer value 79 for each of its accessed variables. In other words, the application module 76 exchanges variable name(s) for pointer value(s) into shared memory 48 and thus is able to access these variable(s) by reference in shared memory 48.

Although each variable is only registered once with the messager 78 for creation, any requesting application module that knows its name may determine a pointer value to this variable. To do so, each requesting application maintains a name and pointer table that pairs each requested variable name with a pointer value. As described above, a pointer value, which is unique to each application module, is determined by getting that variable's shared memory offset value from the messager 78 and adding it to module's base address for mapping shared memory.

At this point, all commands from script file 72 have been read. The startup module 70 is terminated and the application modules 76 begin execution of their numerical control tasks. In order to implement this variable linkage mechanism, application modules 76 within the software architecture 40 are preconfigured to interface with messager module 78. Exemplary source code for implementing this interface has been included in Appendix A.

Moreover, the variable linkage mechanism can be used to establish communication between two or more third party software components. In this case, a third party module is designed to register its variables with the messager module 78. As will be apparent to one skilled in the art, other third party software components can be designed to access these registered variables. In this way, the variable linkage mechanism can be used to support communication outside of the software architecture 40 of the present invention.

Figure 5:
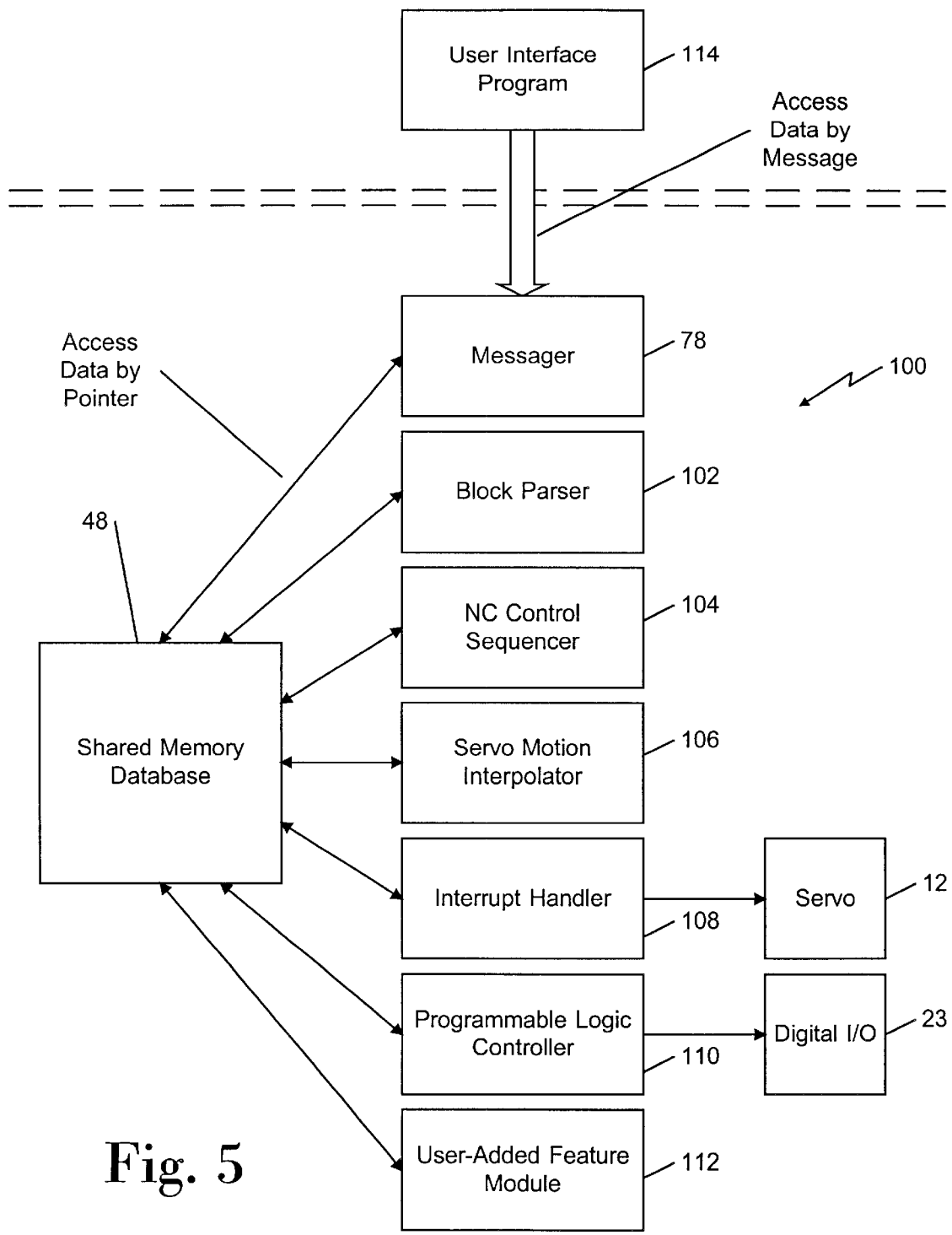
FIG. 5 is a block diagram showing a preferred embodiment a computer-implemented system in the present invention.

A preferred embodiment of the software architecture 100 for supporting the software-based numerical control system 30 is further described in relation to FIG. 5. The control is broken down into several asynchronously running modules. In addition to the messager 78, there is a block parser 102 to convert the user's part program into an internal binary form which represents motion control commands, a sequencer 104 issues motion control commands to a move interpolator, thereby coordinating the control functions in the correct sequence, the move interpolator 106 which generates the path trajectory, and an interrupt handler 108 to close the servo loop. A programmable logic controller 110 and other user-added modules 112 are also shown in FIG. 5. All these modules can interact at high speed by sharing data through pointers to the shared memory 48. For programs, such as an user interface program 114, which do not demand high data access rates, the data access can be accomplished by messaging. As will be apparent to one skilled in the art, this data access messaging may be done on one computer or between computers via networking. The software architecture 90 may use any of a variety of commercially available real time operating systems running on a generic computing platform.

The basic architecture described above uses both message passing and shared memory to coordinate between application programs. The original implementation used only message passing between programs, with message passing being handled at the user configurable interrupt handling data rate. The initial approach thus placed a considerable burden on the real time portion of the system (by requiring all message passing to be handled by that system). To reduce this burden the current embodiment uses shared memory for communication between entities that have similar communication urgency requirements. Thus, entities that must coordinate in "real time" utilize the real time database defined in shared memory.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

APPENDIX A

```
/* OpenCNC API include file */
#include ". . ./src/OpenCNC_API.h"
/* table of variables for registration */
/* name, vbits, size, rows, columns, initval */
VARSETTAB varNames [] = {
"usrWantsCompOn", 0, 2, 1, 1, 0, /* 0=off, 1=on */
"", 0, 0, 0, 0, 0 };
/* string names of variables in shared memory */
char *pNames [] = {
    "usrWantsCompOn",
    "mExtCompOn",
    "axLoc",
    "axExtComp",
    ""};
/* structure of pointers to variables in shared memory */
struct
    {
    short *usrWantsCompOn;
    short *mExtCompOn;
    long (*exLoc) [1];
    long (*axExtComp) [1];
    } p;
/* initialize OpenCNC API */
    mdsiOpen (progName);
/* the following section interacts with startup to define variables in shared memory
and then get pointers to them. */
accMsgPid = mdsiFindProg ("accMsg",mid,0);      /* get OpenCNC messager */
if (accMsgPid != getppid()) fatal ("geoComp must be started by accMsg");
startupPid = Receive(0, 0, 0);                  /* wait here for startup */
mdsiVarRegister (accMdgPid, varNames,0);        /* register shared variables */
Reply (startupPid, 0, 0);                       /* let startup run */
startupPid = Receive (0, 0, 0);                 /* wait here for startup */
mdsiShmOpen ("accMsg", mid, 0, &shmFd, &shmPtr);   /* get shared memory */
mdsiVarNames2Ptrs (accMsgPid, pNames, (void **) &p,0,shmPtr);   /* get pointers */
setprio(0,26);                                  /* set run priority */
Reply(startupPid, 0, 0);
/* shared memory setup complete, program can run */
int  OpenCNC_DLLCALL mdsiOpen(char *progname);
/* mdsiOpen () is used to initialize the OpenCNC API.
It should be called once and early before any other API functions.
The argument is:
    progname - A unique identifying ascii name string for this program. */
OpenCNC_DLLEXPORT
void OpenCNC_DLLCALL mdsiShmOpen (char*name, int mid, long length,
                        int *shmFd, char **shmPtr);
/* mdsiShmOpen() is used to acquire or link a program to shared memory.
The arguments are:
    name    - The name of the piece of shared memory.
    mid     - The machine is associated with this shared memory.
    length  - The length of shared memory in bytes, if this is a
              new acquisition. Zero if we are linking to an existing block.
    shmFd   - This function returns the file descriptor.
    shmPtr  - This function returns a pointer to shared memory.
Only one program should acquire a block of shared memory with a given name and
set it's length. All other sharing programs should just link byname and specify a
zero length.
This function must be called to get a shared memory
pointer for use when accessing variables by pointer. */
OpenCNC_DLLEXPORT
int OpenCNC_DLLCALL mdsiVarRegister (long mPid, VARSETTAB varName [], int
jid);
/* mdsiVarRegister () is used to define and register variables in
shared memory which this program wants to create at system startup.
The arguments are:
    mPid       - The pid of the messager managing these variables.
    varName [] - The table of structures with variable definitions for creation.
    jid        - The job stream number or zero.
The function returns: zero for success, non-zero for failure. */
OpenCNC_DLLEXPORT
int OpenCNC_DLLCALL mdsiVarNames2Ptrs(long mPid, char *tab[], void **ptr,
    int jid, char *shmPtr);
/* mdsiVarNames2Ptrs() is used to create pointers
to variables in shared memory at system startup.
The arguments are:
    mPid    - The pid of the messager managing these variables.
    tab []  - A table of variable names to convert to pointers.
    ptr     - The address of the pointer table to be filled by this function.
    jid     - The job stream number or zero.
    shmPtr       - Address of share memory.
```

APPENDIX A-continued

The function returns: zero for success, non-zero for failure.
The variable pointers returned by this function may be variables created by this program or other programs. This implements data sharing between programs using pointer access into shared memory. */
OpenCNC_DLLEXPORT
long OpenCNC_DLLCALL mdsiFindProg (char *name, int mid, char *fname);
/* mdsiFindProg () is used tofind a running program with a registered name.
The arguments are:
    name      - The program name.
    mid       - The machine id.
    fname     - The address of a buffer to return the reformatted name (or null).
The function returns: The program pid for success, zero for failure. */

What is claimed is:

1. A computer-implemented system for supporting control operations in a numerically controlled system, comprising:
   a real-time module for performing numeric control operations through the use of a servomechanism, said servomechanism associated with the numerically controlled system;
   a p-code runtime engine receptive of interpreted program instructions for performing computational operations independent from the control of said servo mechanism;
   a messager module communicating with said real-time module and said runtime engine to implement a pointer architecture that facilitate communication between said real-time module and said runtime engine;
   a shared memory accessible to said real-time module, said runtime engine, and said messager module, said messager module defining a common shared memory location in said shared memory; and
   said real-time module and said runtime engine communicating through said shared memory using said pointer architecture to point from said real-time module and said runtime engine to said common shared memory location, thereby supporting control operations on the numerically controlled system.

2. The computer-implemented system of claim 1 wherein said real-time module includes a first pointer associated with said real-time module that maps to said common shared memory location.

3. The computer-implemented system of claim 2 wherein said runtime engine includes a second pointer associated with said runtime engine that maps to said common shared memory location.

4. The computer-implemented system of claim 3 wherein:
   one of said real-time module and said runtime engine is operative to register a variable with said messager module;
   said messager module being operative, in response to the registration of said variable, to allocate said common shared memory location for said variable and to assign pointer offsets used by said real-time module and said runtime engine; and
   said real-time module and said runtime engine being operative to retrieve said pointer offsets from said messager in order to generate pointers to access said common shared memory location.

5. The computer-implemented system of claim 1 wherein said real-time module issues motion control commands to said servo mechanism, and said runtime engine interprets programmable logic instructions to generate executable digital input output motion commands.

6. The computer-implemented system of claim 1 wherein said servomechanism includes a servo device, a motor and a feedback device.

7. The computer-implemented system of claim 1 wherein said real-time module further comprises:
   an interrupt handler for interfacing with said servo mechanism, said interrupt handler executing and completing control tasks within an interrupt interval, where said interrupt interval is a predetermined duration for monitoring feedback control signals;
   a move interpolator for supplying motion control commands to said interrupt handler; and
   a sequencer for issuing motion control commands to said move interpolator and digital operation commands to said programmable logic controller.

8. A computer-implemented method for supporting control operations in a numerically controlled system, comprising the steps of:
   providing a real-time module for performing numeric control operations through the use of a servomechanism, said servomechanism associated with the numerically controlled system;
   providing a p-code runtime engine receptive of interpreted program instructions for performing computational operations independent from the control of said servo mechanism;
   providing a messager module that facilitates communication between said real-time module and said runtime engine;
   defining a common shared memory location in a shared memory, said shared memory accessible to said real-time module, said runtime engine, and said messager module;
   implementing a pointer architecture to point from said real-time module and said runtime engine to said common shared memory location; and
   communicating between said real-time module and said runtime engine through said shared memory using said pointer architecture, thereby supporting control operations on the numerically controlled system.

9. The computer-implemented method of claim 8 wherein said real-time module includes a first pointer associated with said real-time module that maps to said common shared memory location.

10. The computer-implemented method of claim 8 wherein said runtime engine includes a second pointer associated with said runtime engine that maps to said common shared memory location.

11. The computer-implemented method of claim 8 further comprising the steps of:
   registering a variable with said messager module by one of said real-time module and said runtime engine;
   allocating said common shared memory location for said variable by said messager module in response to the registration of said variable;

assigning pointer offsets by said messager module, said pointer offsets being used by said real-time module and said runtime engine; and retrieving said pointer offsets from said messager and generating pointers to access said common shared memory location by at least one of said real-time module and said runtime engine.

12. The computer-implemented method of claim 8 wherein said real-time module issues motion control commands to said servo mechanism, and said runtime engine interprets programmable logic instructions to generate executable digital input output motion commands.

13. The computer-implemented method of claim 8 wherein said servomechanism includes a servo device, a motor and a feedback device.

14. The computer-implemented method of claim 8 wherein said real-time module further comprises:

an interrupt handler for interfacing with said servo mechanism, said interrupt handler executing and completing control tasks within an interrupt interval, where said interrupt interval is a predetermined duration for monitoring feedback control signals;

a move interpolator for supplying motion control commands to said interrupt handler; and a sequencer for issuing motion control commands to said move interpolator and digital operation commands to said programmable logic controller.

* * * * *